(12) United States Patent
Martschitsch et al.

(10) Patent No.: US 6,764,003 B1
(45) Date of Patent: Jul. 20, 2004

(54) TRANSACTION METHOD AND SELLING SYSTEM

(75) Inventors: Andreas Martschitsch, Herzogenbuchsee (CH); Eric Lauper, Bern (CH)

(73) Assignee: Swisscom Mobile AG, Bern (CH)

(*) Notice: Subject to any disclaimer, the term of this patent is extended or adjusted under 35 U.S.C. 154(b) by 0 days.

(21) Appl. No.: 10/275,734

(22) PCT Filed: May 9, 2000

(86) PCT No.: PCT/CH00/00258
§ 371 (c)(1),
(2), (4) Date: Mar. 26, 2003

(87) PCT Pub. No.: WO01/86515
PCT Pub. Date: Nov. 15, 2001

(51) Int. Cl.$^7$ ............................................. G06K 15/00
(52) U.S. Cl. ....................... 235/383; 235/380; 235/379; 705/16; 705/17; 705/21; 705/26
(58) Field of Search ................................ 235/380, 383, 235/379; 705/17, 21, 16, 26

(56) References Cited

U.S. PATENT DOCUMENTS

| | | | |
|---|---|---|---|
| 5,352,876 A | 10/1994 | Watanabe et al. | 235/381 |
| 6,134,453 A * | 10/2000 | Sainton et al. | 455/553.1 |
| 6,360,141 B1 * | 3/2002 | Jensen | 700/237 |
| 6,535,726 B1 * | 3/2003 | Johnson | 455/406 |
| 6,547,133 B1 * | 4/2003 | DeVries et al. | 235/380 |
| 6,574,603 B1 * | 6/2003 | Dickson et al. | 705/1 |
| 6,601,039 B1 * | 7/2003 | Kolls | 705/14 |
| 2001/0005840 A1 * | 6/2001 | Verkama | 705/67 |
| 2001/0032130 A1 * | 10/2001 | Gabos et al. | 705/14 |
| 2002/0029196 A1 * | 3/2002 | Metcalf et al. | 705/40 |
| 2002/0072976 A1 * | 6/2002 | Virtanen et al. | 705/16 |
| 2002/0187774 A1 * | 12/2002 | Ritter et al. | 455/414 |
| 2003/0004827 A1 * | 1/2003 | Wang | 705/26 |
| 2003/0109244 A1 * | 6/2003 | Tendler | 455/345 |

FOREIGN PATENT DOCUMENTS

| | | |
|---|---|---|
| JP | 08 249530 | 9/1996 |
| WO | 96 13814 | 5/1996 |
| WO | 98 34203 | 8/1998 |
| WO | 98 54678 | 12/1998 |
| WO | 99 33034 | 7/1999 |
| WO | 00 38443 | 6/2000 |

* cited by examiner

*Primary Examiner*—Jared J. Fureman
*Assistant Examiner*—Allyson N. Trail
(74) *Attorney, Agent, or Firm*—Oblon, Spivak, McClelland, Maier & Neustadt, P.C.

(57) ABSTRACT

Proposed is a transaction method between a customer and one of a plurality of service terminals (4) which supply selectable products and/or services, subject to costs, on location, as well as a sales system for carrying out the transaction method, whereby, by means of a portable mobile device (1) of the customer, an order record (6), comprising a service terminal identification (62) of the service terminal (4), is transmitted via a mobile radio network (2) to a service center (3), the service center (3) checking the credit worthiness of the customer from whom the order record was transmitted, and, in the case of positive credit worthiness, transmitting a credit record comprising a credit value via a communication network (2') to the service terminal (4) identified through the service terminal identification (62), and whereby, on the basis of the received credit record, the service terminal (4) releases the selection of a product and/or of a service and supplies the desired product or the desired service corresponding to the selection made by the customer, and a supply confirmation comprising a cost amount for the supplied product or the supplied service is transmitted to the service center (3) which debits the cost amount to an account of the customer.

11 Claims, 2 Drawing Sheets

TRANSACTION METHOD AND SELLING SYSTEM

TITLE OF THE INVENTION

BACKGROUND OF THE INVENTION

1. Field of the Invention

The present invention relates to a transaction method and a sales system. In particular, the present invention relates to a transaction method between a customer and a service terminal, which service terminal supplies on location products and/or services, selectable by the customer, subject to costs, as well as a sales system comprising a multiplicity of such service terminals.

2. Discussion of the Background

Service terminals which supply on location products and/or services selectable by customers, subject to costs, have the advantage that, as a rule, they are open to customers at any time without personnel being needed, except for maintenance tasks and, if applicable, refilling tasks. Mentioned here in a non-exhaustive way as examples of such service terminals should be vending machines, for instance for consumer goods such as foodstuffs and/or luxury foodstuffs and tobacco and/or commodities, ticket vending machines, automated pumps for fuels, and data terminals for obtaining data subject to fees and/or for access to software applications subject to fees, for instance game programs, and/or communication services. In general, the products and/or services are supplied (or respectively made available) by these terminals in exchange for prior payment, the service terminals being equipped therefor with corresponding means for accepting and checking cash payment in the form of coins and/or notes.

Described in the patent publication U.S. Pat. No. 5,352,876 is a vending machine comprising a card reader into which a credit card can be inserted with a credit amount stored thereon for payment of goods to be supplied. According to the patent publication U.S. Pat. No. 5,352,876 the credit amount can also be loaded onto the credit card by the vending machine after successful check of a secret code entered by the customer and after successful credit check by a credit center.

Conventional vending systems with service terminals which supply on location products and/or services selectable by customers have the drawback, however, that the customer either has to have suitable cash in a particular currency since the conventional service terminals, as a rule, support only the local currency of a country, or the customer has to carry on him a credit card accepted by the vending system. Moreover conventional service terminals can only serve one customer at a time, i.e. the ordering, payment and supply of products and/or services are carried out and concluded in the conventional service terminals for one customer in each case before another customer can served.

SUMMARY OF THE INVENTION

Described in the patent application WO 98154678 is a system for access to gasoline (petrol) pumps and for filling the gasoline (petrol) tank of motor vehicles by means of these gasoline (petrol) pumps. According to WO 98/54678, an identification of the gasoline (petrol) pump and an access code are entered by the customer and transmitted to a central control unit by means of a mobile radio telephone. In the central control unit, the access code according to WO 98/54678 is checked, and the identified gasoline (petrol) pump identified, if applicable, for the filling of the gasoline (petrol) tank. According to WO 98154678, checked in addition in the central unit can be whether the respective user is entered on a black list.

It is the object of the present invention to propose a new and better transaction method between a customer and a service terminal which service terminal supplies on location products and/or services, selectable by the customer and subject to fees, and a new and better sales system comprising a multiplicity of such service terminals, which method and system in particular do not have the drawbacks of the state of the art.

This object is achieved according to the present invention through the elements of the independent claims. Further preferred embodiments follow moreover from the dependent claims and from the description.

This object is achieved according to the present invention in particular in that the service terminal transmits, via a contactless device interface, which is independent of the above-mentioned mobile radio network, an executable selection program to a portable mobile device, for example a mobile radio telephone or a communication-capable personal digital assistant (PDA), or a laptop or palmtop computer, the selection program listing on a display of the mobile device products and/or services which are available at the service terminal for selection by the customer, and the selection program generating an order record on the basis of a product selected by the customer and/or a selected service, which order record comprises a service terminal identification for the service terminal and an object identification for the desired product or the desired service, and by means of the communication functions of the mobile device transmits them via a mobile radio network to a service center. The advantage of this selection program is in particular in that the customer does not have to type in any object identifications for products and/or services, whereby entry errors of this kind can be avoided. The object identification is transmitted from the service center via the communication network to the service terminal which supplies the product identified by the object identification or the service identified by the object identification. An advantage of this solution is that, in selecting the desired product and/or the desired service, the customers are not dependent upon the user interface made available by the service terminal and consequently a plurality of customers with their mobile devices are able to order the supply of products and/or services at the same time.

In an embodiment variant, the service center checks the credit worthiness of the customer from whom the order record has been transmitted, and in the case of a positive credit worthiness transmits a credit record comprising at least one credit value via a communication network, for instance a mobile radio network, to the service terminal identified through the service terminal identification. According to this embodiment variant, on the basis of the received credit record, the service terminal releases the selection of at least one of the products and/or at least one of the services, supplies the desired product or the desired service corresponding to the selection made by the customer, and transmits a supply confirmation containing a cost amount for the supplied product or the supplied service to the service center, which bills to the respective customer the cost amount for the supplied product or the supplied service. Through the credit check prior to transmission of the credit record to the service terminal, the service terminals can be relieved of the burden from unnecessary requests from credit-unworthy customers. An advantage of this solution is that, owing to the centralized billing of the costs incurred, currency conversions of the currency of the respective cost amount can be carried out in the numerous service terminals into the currency of the respective customer account without precautions being necessary, whereby points of loyalty point programs can also be accepted and handled as customer currency, so that customers do not have to have available cash in a currency supported by the service terminal. In particular when the mobile radio network used supports roaming across country borders, which is the case, for example, in GSM, UMTS mobile radio networks or also in other, e.g. satellite-based, mobile radio networks, a further advantage of this solution is that the sales system according to the invention can be achieved and used in a cross-national way.

In an embodiment variant, before supply of the desired product and/or the desired service, the service terminal asks the customer to give a confirmation of the desired product or the desired service to be supplied. This confirmation can take place, for example, through actuation of a corresponding operating key and/or through entry of a piece of confirmation information, for instance a predefined number of end digits of the call number of the respective mobile device, which the service terminal compares with end digits which have been transmitted to the service terminal together with the credit record. Supply of undesired products and/or services can be avoided by means of the confirmation. Through the entry and the checking of the confirmation information moreover it can be verified that the same customer is involved from whom the order record was transmitted.

In an embodiment variant, the service center transmits the credit record, together with a service terminal identification for the service terminal from which the product and/or service has been ordered, via the communication network to a service terminal center, which service terminal center passes on the credit record via a communication link to the service terminal identified by the service terminal identification. This variant is advantageous in particular when the service terminals are not set up such that they can receive data directly from the service center via the communication network, so the lacking functions of such service terminals can be assumed by the service terminal center for a plurality of such service terminals.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENT

Figure 1:
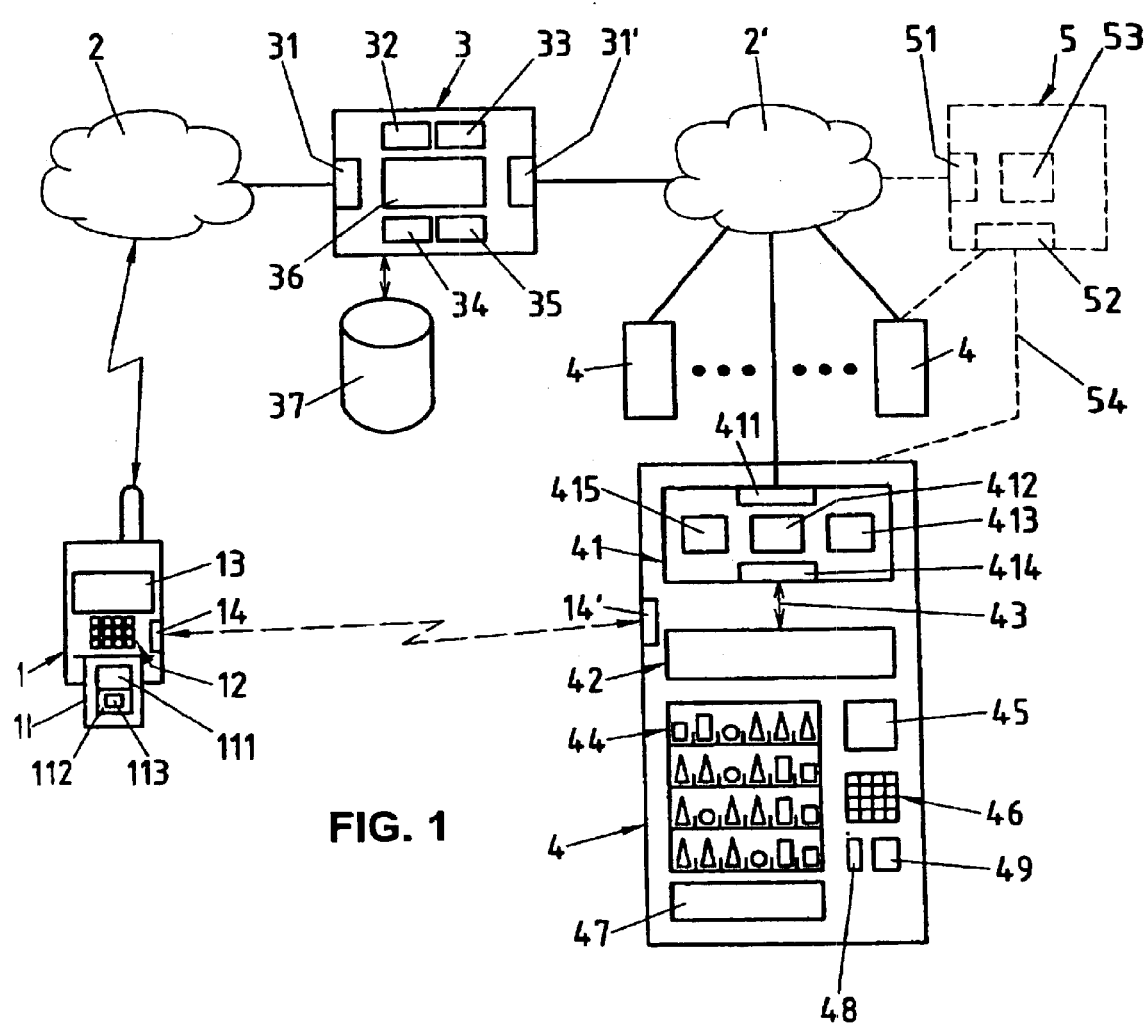
FIG. 1 shows a block diagram representing schematically a sales system with a service center and a plurality of service terminals as well as a mobile device which is connected to the sales system via a mobile radio network.

Referring now to the drawings, wherein like reference numerals designate identical of corresponding parts throughout the several views, preferred embodiments of the present invention are described.

The reference numeral 1 in FIG. 1 refers to a mobile device, for example a mobile radio telephone, or a personal digital assistance (PDA), a palmtop or a laptop computer, which are each set up such that they are able to communicate via the mobile radio network 2, for instance a GSM or a UMTS mobile radio network or another, e.g. satellite-based, mobile radio network. The mobile device 1 comprises a chipcard 11 with processor 111 and data and program memory 112, for example a SIM card 11 (Subscriber Identification Module). The mobile device 1 further comprises a display 13 and operating elements 12, and, optionally, a contactless device interface 14, for instance an infrared interface or a radio interface, e.g. a Bluetooth radio interface.

The reference numeral 4 in FIG. 1 refers to a service terminal which supplies products and/or services selected by the customer. Examples of such service terminals 4 have already been mentioned in the introduction. To achieve the present invention, conventional service terminals of the mentioned type are provided with extension module 41 which is integrated into the housing of the conventional service terminal or is designed as a separate unit, the extension module 41 being connected e.g. via a cable connection, to the service terminal controller bus 43 of the service terminal controller 42 of the conventional service center. The functionality of the extension module 41 can also be integrated directly into the service terminal comtroller 42. As in the conventional service terminals of the mentioned type, the service terminal 4 comprises, in addition to the service terminal controller 42, further components and/or modules which can be controlled by the service terminal controller 42: the actual service module 44, for example a (e.g. electromechanical) device, as indicated in FIG. 1, which contains the products subject to cost and can supply these, for instances through the product dispensing device 47, or a computer, ready for operation, with software applications and/or access to databases, subject to fees, a display 45 for showing information and instruction for customers of the service terminal 4, operating elements 46 for entry of information and instruction by the customer. Optionally, the service terminal 4, like conventional service terminals of the mentioned type, further comprises a payment device 48 which can receive and process e.g. coins, notes and/or credit cards as means of payment, as well as a money changing device 49, which can give change, if applicable. According to the present invention, the payment device 48 and the money changing device 49 of a conventional service terminal of the present type can be replaced by the extension module 41 if the possibility for payment by means of cash and/or credit card is not supposed to be maintained. The service terminal 4 also comprises a memory module (not shown), for instances a network part connectable to the electricity network, and/or a battery and/or solar cells, in a particular for mobile operation.

The extension module 41 comprises a communication module 411 with all hardware and/or software components for data exchange via the communication network 2', for example a fixed network, e.g. a LAN (Local Area Network), the public switched telephone network, or an IP network (Internet Protocol), or a mobile radio network, for instance a GSM or UMTS mobile network or another, e.g. satellite-based, mobile radio network. Furthermore the extension module 41 comprises a bus control module 414 with the hardware and/or software components for communication with the service terminal controller 42 via the service terminal controller bus 43. The link to the control of the service terminal 4 is carried out, for example, via the MDB protocol, according to the Internal Communication Protocol which has been specified by the European Vending Machine Manufacturers Association and defines both the physical as well as the logical interface (version 2.2 of $8^{th}$ Oct. 1997). The service terminal controller bus 43 is, for example, a serial current loop bus according to MDB specification chapters 1 and 2. The extension module 41 further comprises programmed software modules which are executed on a processor (not shown) of the extension module 41, i.e. the transaction module 412 and the confirmation module 413, the functions of which will be described later, as well as, in an embodiment variant, a selection program 415 executable in a mobile device 1 which is stored in a memory of the extension module 41.

The reference numeral 3 in FIG. 1 refers to a service center, which is based on a server (computer), available on the market, and a communication module 31 with hardware and software components for communication via the mobile radio network 2 as well as a communication module 31' with the hardware and software components for communication via the communication network 2'. The service center 3 comprises moreover programmed software modules which are executed on a processor (not shown) of the service center 3, i.e. the filter module 32, the credit record module 33, the credit checking module 34, the billing module 35 as well as the transaction module 36, the functions of which will be described later. As is further apparent from FIG. 1, the service center 3 has moreover access to a database 37, which will likewise be described later.

A customer who would like to obtain a product and/or service from the service terminal 4, requests the delivery of this product and/or service in that he transmits an order record 6, 6' (see FIGS. 2a and 2b ) by means of his mobile device 1 via the mobile radio network 2 to the service center 3. The order record is transmitted, for example, in a data message, for instance a SMS message (Short Message Service) or a USSD message (Unstructured Supplementary Services Data) or a data packet of the GPRS service (Generalized Packet Radio Service). The use of USSD messages is preferred over the use of SMS message since USSD messages are not transmitted in store-and-forward mode, like SMS messages, but instead can be transmitted directly and thus faster. Transmitted USSD messages are passed on by the signaling system of the mobile radio network 2, for example a CCITT signaling system Number 7 (SS7), to the Home Location Register (HLR) of the respective customer, from where they can be further transmitted, in the present case, to the service center 3. An advantage of the transmission of a order record by means of a USSD message, which has been defined, for example, in the standard GSM 02.90, 03.90 and/or 04.90 for Unstructured Supplementary Service Data (USSD) by the European Telecommunications Standards Institute (ETSI), is that this is very user-friendly since it is very easy for a user to write a USSD message and send it, e.g. easier than a SMS message. Moreover USSD messages can be further transmitted automatically by a user who is roaming in a visited network (Visited Public Land Mobile Network, VPLMN) from this VPLMN via the signaling system to the HLR of this customer even when outgoing calls and/or SMS messages are blocked for the user in the VPLMN. A further advantage is that the transmission of a USSD message can take place more quickly and free of charge since the USSD message is passed on via the signaling system.

Figure 2A:
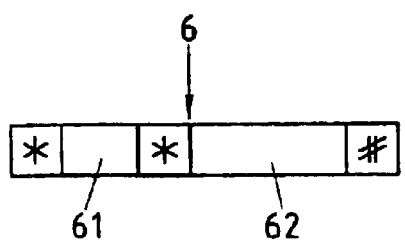
FIG. 2a shows schematically a possible set up for an order record.
Figure 2B:
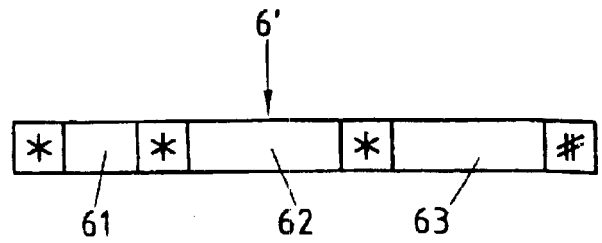
FIG. 2b shows schematically a further possible set up for an order record.

Illustrated in FIGS. 2a and 2b are examples of the structure of the order record 6, 6' for transmission as USSD messages. The USSD order record 6 shown in FIG. 2a comprises, following a*symbol, a service code 61, thereafter a further*symbol, after which a service terminal identification 62 follows and a final # symbol. The service code 61, for example a numerical sequence, serves to indicate the service through which the data message is supposed to be transmitted, i.e. the ordering of products and/or services from service terminals of the mentioned type. According to the standard 02.90 (03.90, 04.90) for Unstructured Supplementary Service Data (USSD) of the European Telecommunications Standards Institute (ETSI), the service code 61 has three digits and preferably has a value in the range of 100 to 149, which has the consequence that such a USSD message is transmitted from a visited network (Visited Public Land Mobile Network, VPLMN) directly into the home network (Home Public Land Mobile Network, HPLMN). The USSD order record 6' shown in FIG. 2b comprises additionally an object identification 63, which is inserted before the closing # symbol and is marked off from the service terminal identification 62 by an additional symbol. The object identification 63 serves to identify the desired product and/or the desired service. The object identifications for products and/or services are indicated to the customer at the respective service terminal 4.

The order records 6, 6' can be entered, for example, symbol by symbol by the customer by means of operating elements 12 of the mobile device 1 and sent via the mobile radio network 2 by means of the SEND command. In an embodiment variant the mobile device 1 comprises a software program 113 for the generation of order records, which are stored in a memory 112 on a chipcard 11, for example, and are executed on the processor 111 of the chipcard 11 or on another processor of the mobile device 1. This software program 113 can be started by the customer, for example, by means of the entry means 12 of the mobile radio device 1. The software program 113 generates an order record 6 with the service code for ordering products and/or services from service terminals, and asks the customer, e.g. via the display 13 of the mobile device 1 to enter the service terminal identification 62 for the service terminal 4 from which a product and/or service is supposed to be ordered, for instance by means of the entry means 12 of the mobile device 1. Service terminal identifications 62, which consist of a series of numbers, for instance, are placed on the service terminal 4 in a way clearly visible to the customer. The service terminal identification 62 entered by the customer is received by the software program 113 and is inserted into the order record 6. The created order record 6 can be transmitted via the mobile radio network 2 by the software program 113, for instance after prior confirmation by the customer, by means of communication functions of the mobile device 1. The software program 113 is supported, for instance, by the SIM toolkit defined according to GSM 11.14.

As mentioned above, the described USSD order record 6, 6' is passed on directly into the HPLMN when it is transmitted in a VPLMN. Moreover one skilled in the art can define the HPLMN in such a way that USSD order records 6, 6' are transmitted with the service code 61 (for ordering products and/or services from service terminals 4) to the service center 3. The communication module 31 of the service center 3 comprises, for example, a MAP interface which can receive the USSD message 6, 6', described above, from the HLR by means of messages of the Mobile Application Part (MAP). The MAP interface is executed, for example, on the server of the service center 3 as the interworking unit which comprises conventional hardware and software components for receiving MAP messages from the HLR, for example via a SS7 signaling system.

In the service center 3, the USSD messages 6, 6', or respectively the data contained therein, received via the communication module 31 are passed on to the filter module 32. The filter module 32 is a programmed software module which compares the service code 61 contained in the received USSD message 6, 6' with the predefined service code for ordering products and/or services from service terminals 4. The filter module 32 transmits the data from received USSD messages 6, 6' which have no service code for ordering products and/or services from service terminals 4 to a processing module (not shown), for instance. Data from USSD messages 6, 6' which have a service code for ordering products and/or services from service terminals 4 and which are recognized by the filter module 32 are received as order records 6, 6' and are forwarded to the transaction module 36 for further processing.

On the basis of a received order record 6, 6', the transaction module 36 initiates a transaction, for instance in that an unambiguous transaction number is generated and transaction data are stored assigned to this transaction number. Besides the service terminal identification 62 (and if applicable the object identification 63) and e.g. time and date indication with respect to the receiving of the order record 6, 6', data for identification of the respective customer are preferably also received and stored as transaction data. It should be explained here that the identity of the customer is given in each case through the International Mobile Subscriber Identity (IMSI) stored on the SIM card 11, which identity is assigned in the HLR to a MSISDN (Mobile Subscriber ISDN). The IMSI and/or the assigned MSISDN can be captured and stored as data for identification of the respective customer in the service center 3, for instance via the above-mentioned MAP interface.

On the basis of the indications for identification of the respective customer, the credit checking module 34 determines the credit worthiness of the respective customer, for instance from a database 37, e.g. a subscriber database which is administered by the operator of the mobile radio network 2, or with the aid of corresponding online financial services of financial service providers. In the case of lack of credit worthiness, a corresponding message, for example a USSD or SMS message, can be transmitted, for instance by the credit checking module 34, to the mobile device 1 of the customer. In the case of positive credit worthiness of the customer, a credit record is generated by the credit record module 33 and is transmitted over the communication network 2' to the service terminal 4 identified by the service terminal identification 62. If the communication network 2' is a mobile radio network, the credit record can be transmitted to the respective service terminal 4 in the form of a SMS or USSD message. The credit record contains a credit value, for example ten Swiss francs, which is predefined or is determined by the credit record module 33 taking into consideration the service terminal 4 identified by the service terminal identification 62 or respectively the cost amounts (prices) of the products and/or services offered by this service terminal 4, or, if applicable, taking into account the cost amount (price) of the product or service identified through the object identification 63. The credit record also contains, for example, the above-mentioned transaction number and/or the service terminal identification 62 and/or, if applicable, the object identification 63. Instead of the transaction number, data for identification of the customer, for instance his IMSI or MSISDN number, can be used as transaction identification. Furthermore the MSISDN number or at least a predefined number of end digits of the MSISDN number can moreover be transmitted for confirmation purposes, which will be gone into later, together with the credit record to the respective service terminal 4.

It should be mentioned here furthermore that the communication between the service center 3 and the service terminal 4 can also take place via the service terminal center 5 indicated in FIG. 1 by broken lines. Credit records, for instance, are thereby transmitted from the communication module 31' via the communication network 2' to the service terminal center 5, where they are received by the corresponding communication module 51 of the service terminal center 5 and are forwarded by the rerouting module 53 with the aid of the interface module 52 to the service terminal 4 identified through the service terminal identification 62. The communication module 51 and the interface module comprise all necessary hardware and software components for communication via the communication network 2', or respectively via the communication link 54, for instance a serial interface (e.g. RS 232 or RS 485) to a service terminal 4 in each case.

The credit record is received in the extension module 41 of the service center 4 from the communication module 411 via the communication network 2', or respectively via the communication link 54. The communication module 411 comprises all necessary hardware and software components for communication via the communication network 2' or respectively via the communication link 54.

Figure 3:
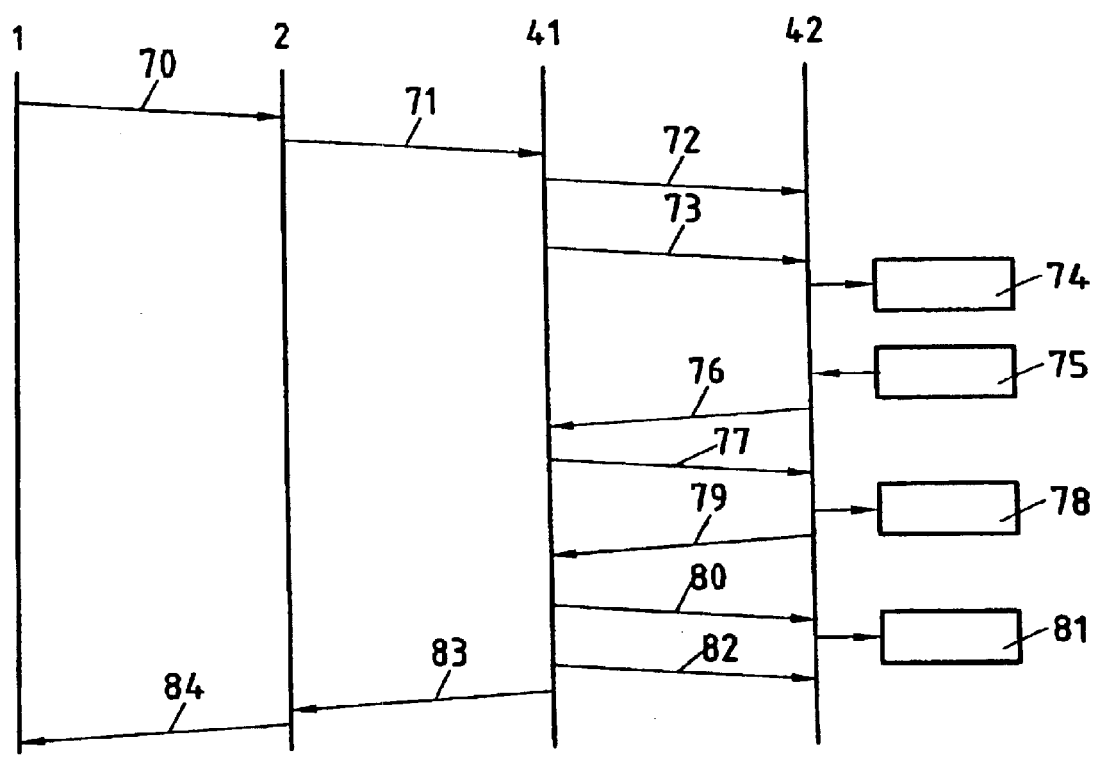
FIG. 3 shows a time-dependent diagram illustrating schematically the information flow between the mobile device, the service center and the service terminal, the possible information flow in the service terminal as well as certain possible operations of the service terminal likewise being shown.

Illustrated schematically in FIG. 3 is the information flow between the mobile device 1, the service center 3 and a service terminal 4. Indicated by the arrow 70 is the transmission of the order record 6, 6' from the mobile device 1 to the service center 3. Indicated by the arrow 71 is the transmission of the credit record from the service center 3 to the service terminal 4. The information flow between the extension module 41 and the service terminal controller 42 is indicated here only by way of example, and depends upon the type of service terminal 4 used, or of service terminal controller 42.

As is illustrated in FIG. 3, on the basis of the received credit record, the transaction module 412 of the extension module 41 gives an instruction "open session", indicated by the arrow 72, and afterwards an instruction "enable credit", indicated by the arrow 73, with the credit value contained in the credit record, to the service terminal controller 42. The transaction module 412 handles incoming credit records and thus can be designed such that it can temporarily store a plurality of order transactions (credit records) at the same time, each of which are signed through their assigned transaction numbers and can handle them according to FIFO (first in-first out), for example. As is indicated in step 74, the credit value is then indicated on the display 45 of the service terminal 4 by the service terminal controller 42, and the selection of a desired product and/or service is released for the customer. In step 75, the service terminal controller 42 receives the selection of the desired product and/or service via the operating elements 46 of the service terminal 4. As is indicated by the arrow 76, following successful selection, the service terminal controller 42 gives the reply "request dispense" to the extension module 41, for example together with the object identification and/or the cost amount (price) for the selected product and/or selected service.

Before the actual delivery of the selected product or the selected service, the confirmation module 413 can now instruct the service terminal controller 42 to request the entry of a confirmation by the customer. This confirmation can take place, for instance, through actuation of a corresponding function key and/or through entry of confirmation information, e.g. a predefined number of end digits of the call number (MSISDN) of the respective mobile device 1, which the confirmation module 413 compares with end digits which have been transmitted together with the credit record to the service terminal 4. For example, after this successful confirmation, the transaction module 412 (or the confirmation module 413) gives the instruction "allow dispense" to the service terminal controller 42, as is indicated by the arrow 77 in FIG. 3. Afterwards, in step 78, the selected product and/or the selected service is supplied, and, as indicated by the arrow 79, the reply "dispense confirm" is given to the extension module 41 by the service terminal controller 42, for instance together with the object identification and/or the cost amount (price) for the delivered product or the supplied service. The transaction module 412 can determine the remaining credit for the respective transaction from the original credit value and the actual cost amount for the delivered product or the delivered service, and, as indicated by the arrow 80 in FIG. 3, can give the instruction "enable credit" with the remaining credit to the service terminal controller 42, which shows this remaining credit on the display 45 of the service terminal 4 in step 81. The transaction module 412 can be designed in such a way that the selection of further products and/or services can be released as long as the remaining credit exceeds a predefined value, or the transaction module 412 can give the instruction "end session" to the service terminal controller 42 following the delivery of a product or a service, as indicated by the arrow 82 in FIG. 3. The transaction module 412 transmits, as is indicated by the arrow 83 in FIG. 3, a delivery confirmation comprising the object identification for one or more delivered products and/or services as well as the corresponding cost amount, possibly a related currency indication and the transaction number, via the communication network 2' or respectively the communication link 54 and the service terminal 5 to the service terminal 3. The transaction module 412 can also be designed in such a way that it temporarily stores in the service terminal 4 the captured cost amounts for the individual transactions, and only at a later point in time transmits them in batch mode to the service center 3, for instance periodically or upon request of the service center 3.

In the service center 3, a delivery confirmation is transmitted e.g. by the transaction module 36, as is indicated by the arrow 84 in FIG. 3, via the mobile radio network 2 to the respective mobile device 1, for example in the form of a USSD or SMS message. Based on the delivery confirmation received in the service center 3, the cost amount indicated therein is billed to the respective customer by the billing module 35, taking into account the currency relating thereto, which is contained in the delivery confirmation or is determined for the respective service terminal 4 from a database with information about service terminals 4. The billing module 35 debits the cost amount to the customer determined e.g. through the above-mentioned IMSI to his subscriber account in the database 37 or to an account of the customer with a financial services provider. The billing of the cost amounts debited to the subscriber account can take place, for example, via the telephone bill of the respective customer. The debiting of the cost amounts can also take place to a particular prepaid account determined through the IMSI or the MSISDN so that the personal identity of the customer can remain anonymous. The prepaid account can also be set up, for example, directly on the chipcard 11.

In an embodiment variant, the service terminal 4 further comprises a memory with a selection program 415 stored therein which is executable on a processor of the mobile device 1, for instance on a processor 111 of the chipcard 11. The selection program 415 is, for example, a Java applet (Java is a registered trademark of the company Sun Microsystems) or another platform-independent program object. The selection program 415 comprises an inventory list of the products and/or services currently available in the respective service terminal 4, which list is updated through corresponding software functions in the service terminal 4.

The selection program 415 can be transmitted via a contactless device interface 14'–14 from the service terminal 4 to the mobile device 1 and is executed e.g. on the processor 111 of the chipcard 11, for instance as a reply to a corresponding request generated by the mobile device 1, and transmitted, for example, via the contactless device interface 14–14' to the service terminal 4. The selection program 415 can also be requested by the mobile device 1 via the mobile radio network 2, the service center 3, and the communication network 2', or respectively the communication link 54, and transmitted to the mobile device 1.

Through the execution of the selection program 415 in the mobile device 1, the objects and/or services available in the service terminal 4 are displayed on the display 13 of the mobile device 1 of the respective customer for selection. After successful selection by the customer, the selection program 415 generates the order record 6', which contains, in addition to the service code 61 and the service terminal identification 62, also the object identification 63, and transmits this order record, as described above, to the service center 3 with the aid of communication functions of the mobile device 1.

If, in addition, the object identification 63 is also transmitted (inserted by the selection program 415 or by the customer, for example) in the order record 6', the steps 73 to 76 described above (see fig. 3) can be skipped, and the instruction "allow dispense" together with the respective object identification given directly to the service terminal controller 41 by the extension module 41.

What is claimed is:

1. A transaction method between a customer and one of a multiplicity of service terminals, which service terminals supply on location products and/or services, selectable by customers, subject to costs, wherein the service terminal comprises a vending machine having an integrated communication module configured to transmit by a contactless interface a platform independent executable selection program directly to a mobile device of the customer, the executable selection program lists on a display of the mobile device products and/or services available in the service terminal for selection by the customer, and the executable selection program generates an order record based on a product and/or service selected by the customer, the order record comprises a service terminal identification for the service terminal and an object identification for a desired product or a desired service, and by the portable mobile device the service terminal identification is transmitted by a mobile radio network to a service center, the service center checks credit worthiness of the customer from whom the order record was transmitted, and, in a case of positive credit worthiness, transmits a credit record comprising at least one of a credit value and the object identification by a communication network to the service terminal identified through the service terminal identification, based on the received credit record, the service terminal releases selection of at least one of the products and/or services identified through the object identification, and, corresponding to the selection made by the customer, supplies the desired product or the desired service and transmits to the service center a supply confirmation containing a cost amount for the supplied product or the supplied service, and the service center bills to the customer the cost amount for the supplied product or the supplied service.

2. The transaction method according to claim 1, wherein before supply of the desired product or the desired service, as a confirmation of the desired product or the desired service to be supplied, the service center asks the customer to enter a predefined number of end digits of the call number of the mobile device, and wherein the service terminal compares the end digits entered by the customer with end digits that have been transmitted to the service terminal together with the credit record.

3. The transaction method according to claim 2, wherein the service center transmits the credit record together with the service terminal identification for the service terminal by the communication network to a service terminal center, which service terminal center passes on the credit record by a communication link to the service terminal identified through the service terminal identification.

4. The transaction method according to claim 1, wherein the service center transmits the credit record together with the service terminal identification for the service terminal by the communication network to a service terminal center, which service terminal center passes on the credit record by a communication link to the service terminal identified through the service terminal identification.

5. The transaction method according to claim 1, wherein the mobile device comprises means for manually entering the service terminal identification by the customer.

6. The transaction method according to claim 1, wherein the service terminal transmission comprises one or more unstructured supplementary service data message.

7. A sales system comprising a multiplicity of service terminals, which service terminals supply on location products and/or services selectable by customers, subject to costs, wherein the service terminals each comprise a vending machine having an integrated communication module and a contactless device interface, the service terminals each comprise a memory unit in which a platform independent executable selection program is stored, through which executable selection program a processor of a mobile device is controllable such that the processor lists on a display of the mobile device products and/or services available at the service terminal for selection by the customer and generates an order record based on a product or service selected by the customer, and wherein the integrated communication module is configured to transmit the executable selection program by the contactless interface directly to the mobile device, the sales system comprises at least one service center, which comprises means for receiving data messages from mobile devices by a mobile radio network, and for recognizing and accepting order records from among the data messages, which order records each contain an object identification for a desired product or a desired service and a service terminal identification for the service terminal from which service terminal a desired product and/or a desired service is supposed to be supplied, the service center comprises means for taking the object identification from the order record, and the service center comprises means for checking credit worthiness of the customer from whom the order record has been transmitted, and, in a case of positive credit worthiness, for transmitting a credit record containing at least one of a credit value and the object identification by a communication network to the service terminal identified through the service terminal identification, the service terminal comprises means for releasing selection of at least one of the products and/or at least one of the services, in each case based on the received credit record, and for supplying the desired product or the desired service corresponding to the selection made by the customer and for transmitting a supply confirmation to the service center containing a cost amount for the supplied product or the supplied service, and the service center comprises means for billing to the customer the cost amount for the supplied product or the supplied service.

8. The sales system according to claim 7, wherein the sales system comprises a service terminal center connected by the communication network to the service center, and comprises means for receiving the credit record together with the service terminal identification from the service center and of passing on, by a communication link, the credit record to the service terminal identified through the service terminal identification.

9. The sales system according to claim 7, wherein the service terminal comprises means for asking the customer to enter a predefined number of end digits of the call number of the mobile device before supply of the ordered product to confirm the desired product or the desired service to be supplied, and wherein the service terminal compares the end digits entered by the customer with end digits that have been transmitted to the service terminal with the credit record.

10. The sales system according to claim 7, wherein the mobile device comprises means for manually entering the service terminal identification by the customer.

11. The sales system according to claim 7, wherein the service terminal transmission comprises one or more unstructured supplementary service data messages.

* * * * *